US009496577B2

United States Patent
Arias-Thode et al.

(10) Patent No.: US 9,496,577 B2
(45) Date of Patent: Nov. 15, 2016

(54) SELF-BURYING SEDIMENT ENERGY HARVESTER

(71) Applicants: Yolanda Meriah Arias-Thode, San Diego, CA (US); Lewis Hsu, Lomita, CA (US); Joshua Bianchi, San Diego, CA (US); Ryan John Halonen, San Diego, CA (US); Bart Chadwick, San Diego, CA (US)

(72) Inventors: Yolanda Meriah Arias-Thode, San Diego, CA (US); Lewis Hsu, Lomita, CA (US); Joshua Bianchi, San Diego, CA (US); Ryan John Halonen, San Diego, CA (US); Bart Chadwick, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 366 days.

(21) Appl. No.: 14/297,124

(22) Filed: Jun. 5, 2014

(65) Prior Publication Data

US 2015/0357666 A1 Dec. 10, 2015

(51) Int. Cl.
*H01M 8/16* (2006.01)

(52) U.S. Cl.
CPC .............. *H01M 8/16* (2013.01); *Y02E 60/527* (2013.01)

(58) Field of Classification Search
CPC ........................ H01M 8/16; Y02E 60/527
See application file for complete search history.

(56) References Cited

U.S. PATENT DOCUMENTS

| 7,736,094 | B1 | 6/2010 | Bianchi et al. |
| 8,430,601 | B1* | 4/2013 | Chadwick ............... E02F 5/106 405/159 |
| 8,496,410 | B2 | 7/2013 | Winter, V et al. |
| 8,715,867 | B1* | 5/2014 | McNeilly ............ H01M 4/8626 429/2 |
| 8,916,299 | B1* | 12/2014 | Liu .................. H01M 8/16 114/317 |

OTHER PUBLICATIONS

Chadwick, D.B. et al. "Sled for Benthic Microbial Fuel Cell Deployment with Carbon Fabric Anodes", OCEANS '11 MTS/IEEE KONA, Sep. 2011.*

* cited by examiner

*Primary Examiner* — Carlos Barcena
*Assistant Examiner* — Lilia V Nedialkova
(74) *Attorney, Agent, or Firm* — SSC Pacific Patent Office; Arthur K. Samora; Kyle Eppele

(57) ABSTRACT

A self-burying microbial fuel cell can include a housing with conductive elements. An anode and cathode can be integrated into the housing at respective proximal and distal ends. A self-burying means for partially burying the microbial fuel cell in a submerged environment is included, so that the anode is buried but the cathode is exposed to the submerged environment can be included. The self-burying means can include omni-directional vibrating device located within the housing, a plurality of intake ports formed in the housing for a pump within the housing. The pump outputs into a longitudinal fluid conduit that extends through the housing and exits at the distal end of the housing. When the vibrating device activates at the same time as the pump, temporary slurry can be formed at the extreme distal end of the device, and the vibrating action causes the microbial fuel cell to become partially buried.

14 Claims, 5 Drawing Sheets

SELF-BURYING SEDIMENT ENERGY HARVESTER

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc pac t2@nav.mil, referencing NC 101761.

FIELD OF THE INVENTION

The present invention pertains generally to microbial fuel cells. More specifically, the present invention pertains to microbial fuel cells that are self-burying for ease of deployment and more survivable in an ocean environment (attributed to ability to anchor), and that have an internal power supply to maximize the deployment cycle for the microbial fuel cell.

BACKGROUND OF THE INVENTION

Fuel cells are well known in the prior art. A fuel cell differs from a battery in that it is a thermodynamically open system where the fuel source reactant is continuously supplied from an external source. Microbial fuel cells (MFC's) are also well known in the prior art. A MFC can use the metabolic process of microbes (such as bacteria, for example) from the surrounding environment to catalyze the conversion of chemical energy into electrical energy. More specifically, electrical charges can be generated and expelled during the metabolic process of bacteria, which converts organic matter in the soil or sediment, such as acetates, fatty acids, and aromatics, into by-products of carbon dioxide and positive hydrogen ions. Microbial fuel cells essentially take electrons from bacteria either directly or indirectly, and convert into electrical energy. Compared to traditional fuel cells, MFCs can be more flexible to operate, less expensive to construct, and can harvest energy directly from the environment, waste streams, and other ubiquitous sources of organic matter. MFCs have found applications in harvesting energy from sediments in rivers, lakes, and oceans, as well as from a range of waste streams such as municipal sewage treatment plants.

For an MFC to function effectively, the generated charges must effectively transfer from the bacteria to the anode of the MFC. Once this occurs, the resulting electrical current can travel across and through the anode to either serve as an electric energy source to instantaneously power load electronics, or to charge storage devices such as batteries, capacitors, super capacitors and similar components. Energy (electrical charges, or electrons) that is not dissipated in the load electronics can continue to flow to the cathode, to chemically react with oxygen and positive ions and thereby create thermal energy and chemical by-products. But in order for this to occur, the MFC anode must generally be operated under anerobic conditions while the MFC cathode must be operated under aerobic conditions. For benthic MFCs operating on the seafloor (BMFCs), this generally requires that the anode be buried beneath the sediment surface, while the cathode is suspended in the water above the sediment. Positioning these components is vital to the success of these BMFC systems, since the electrodes must each be placed in specific, isolated locations of the environment relative to the natural reduction-oxidation (redox) gradient.

Deployment of BMFCs by divers has traditionally been the primary mechanism for ensuring proper orientation and placement of the anode and cathode at the sediment ocean interface. Other methods that have been used can include sled deployment, placement by remotely operated vehicle, and in very shallow water, systems have been deployed by wading or divers.

Once seafloor systems, such as the self-burying system described here, have been deployed, their persistence (effective deployment life) is typically limited by the finite energy of an enclosed battery. If a BMFC were integrated into the self-burying system, it would be possible to "trickle charge" the system with energy harvested by the BMFC and thus significantly extend the life cycle of the self-burying device.

In view of the above, it is an object of the present invention to provide an MFC that is self-burying. Another object of the present invention to provide an MFC that is self-sustaining, in terms of generating its own operating power. Still another object of the present invention is to provide an MFC that provides an increased deployment life cycle of seafloor systems. Yet another object of self-burying MFC of the present invention can be to provide added anchoring strength for the MFC, to guard against and withstand fishing hazards, such as fishing nets and the like. Another object of the present invention to provide a MFC, which can be easily deployed, without the use of divers or additional equipment. Still another object of the present invention to provide a MFC, which can be manufactured and deployed in a cost-efficient manner.

SUMMARY OF THE INVENTION

A microbial fuel cell in accordance with several embodiments of the present invention can include a housing with an integrated anode, cathode and internal conductor and electronics. An anode can be integrated into the housing at the housing proximal end, and a cathode can be integrated into the housing at the distal end. The housing can incorporate a conductor and harvesting electronics in the mid-section located between the cathode and the anode. The housing can be made from a material that does not easily corrode in a seawater environment. The mid-section of the housing can serve as a means of isolating the anode from the cathode and thus maintaining the MFC potential, while also incorporating internal conductors and electronics that can harvest the energy from the MFC. The buried anode portion of the housing can be constructed from non-corroding, conductive materials such as titanium, platinum, graphite, activated carbon, carbon fiber, or other carbon nanomaterial.

The system design can further include a means for self-burying the MFC in a submerged environment, so that said anode is buried in an anaerobic zone, but the cathode is exposed to the submerged environment. To do this, the system can include an omni-directional vibrating device located within the housing. In still other embodiments, the distal end of the MFC can be weighted by adding sufficient weight so that the MFC buries upon impact alone, due to gravity. A plurality of intake ports can be formed in the housing, and a pump can be placed in fluid communication with the plurality of intake ports. The pump output can be in fluid communication with a longitudinal fluid conduit, which can extend through the housing and exits at the distal end of the housing. When the vibrating device activates in conjunction with the pump, a decrease in sediment resistance can occur around the distal end of the MFC. The reduction in sediment resistance can allow the MFC to become at least partially buried. For some embodiments, the vibrating device can remain dry (isolated by the submerged environment fluid). In other embodiments, a payload can be positioned within the housing, but in fluid isolation from the burying device, and a power source can be electrically connected to the pump portion of the burying means, the payload, and the MFC.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figures 1, 2, 3:
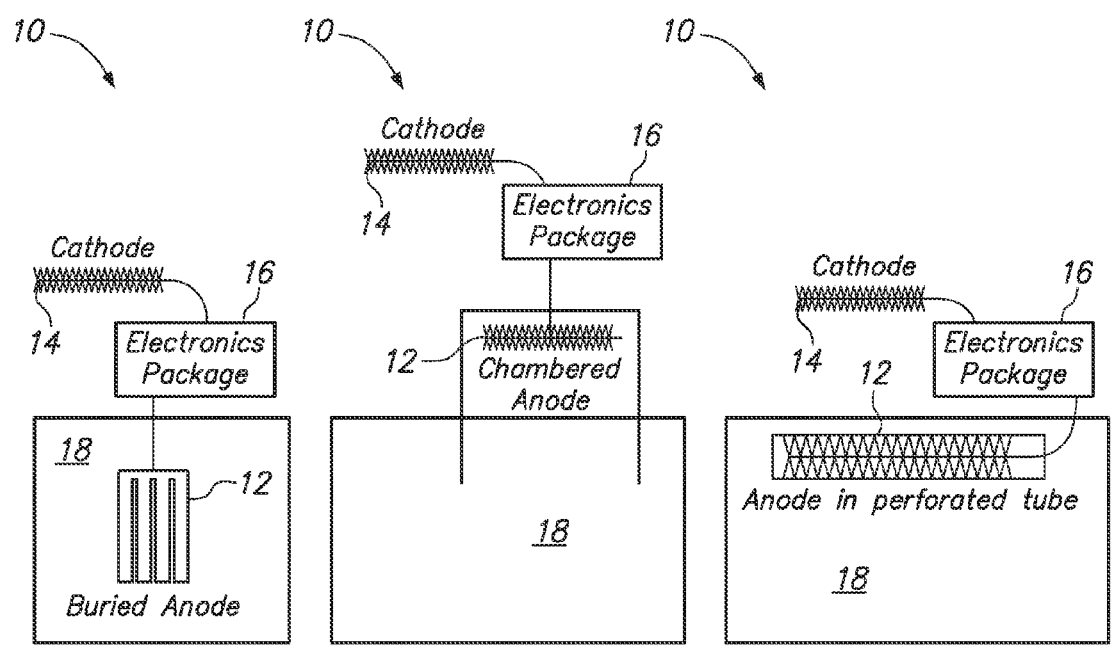
FIG. 1 is a block diagram of a microbial fuel cell of the prior art.
FIG. 2 is a block diagram of an alternative configuration of the prior art microbial fuel cell of FIG. 1.
FIG. 3 is a block diagram of an alternative configuration of the prior art microbial fuel cell of FIG. 1.

Referring initially to FIGS. 1-3, a microbial fuel cell as known in the prior art is shown an illustrated by reference character 10. As shown, microbial fuel cell (MFC) 10 can include an anode 12 which is buried in or in contact with sediment 18, a cathode 14 and an electronics package 16. FIGS. 2-3 illustrate an MFC 10 utilizing a "bottlebrush electrode" as the anode 12 and/or cathode 14, and in FIG. 3 the anode 12 resides in a permeable tube. It is unclear whether this device could be a self-deployable system or if the system could require divers or submersibles to position the electrodes. But in general, the prior art benthic MFC designs shown in FIGS. 1-3 have generally required manual placement of the anode 12 and cathode 14 in appropriate positions at the sediment-water interface, using divers, underwater sleds or some combination thereof.

Figure 4:
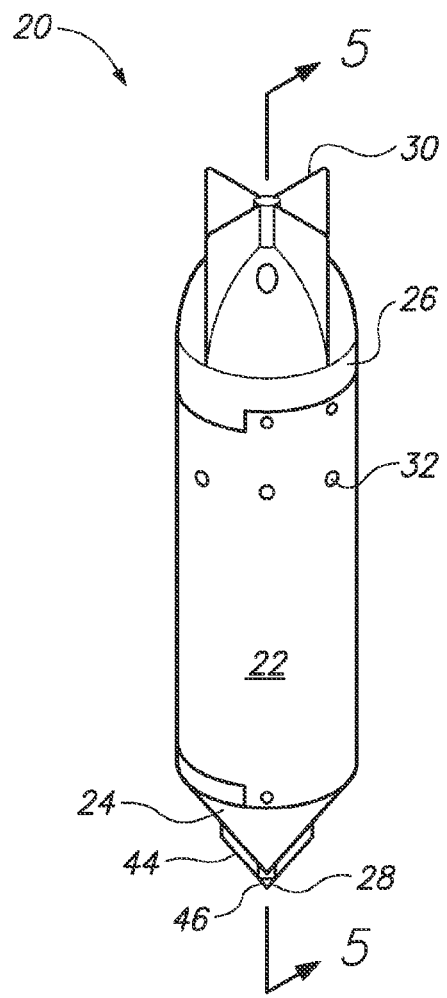
FIG. 4 is a side elevational view of the self-burying microbial fuel cell of the present invention according to several embodiments.
Figure 5:
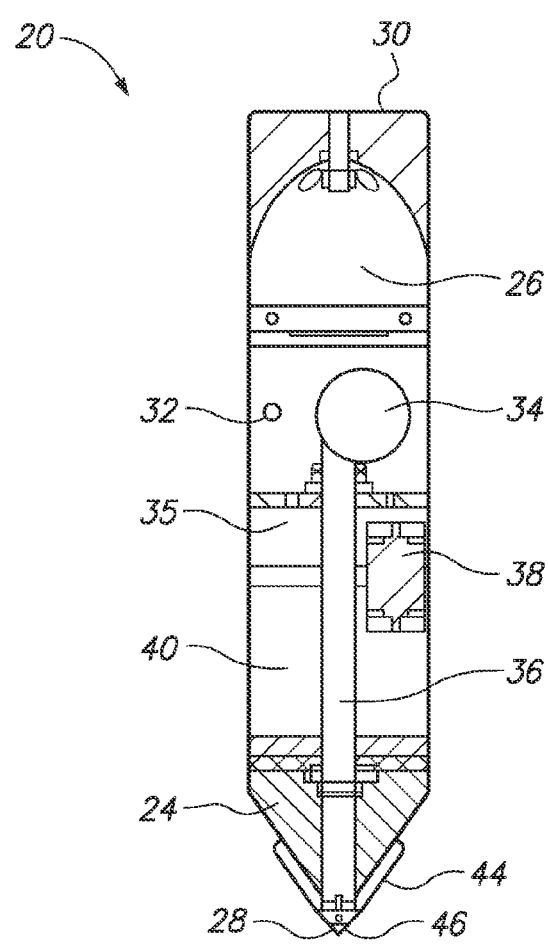
FIG. 5 is a cross-sectional view taken along line 5-5 in FIG. 4.

Referring now to FIGS. 4-5, a self-burying MFC 20 of the present invention according to several embodiments is shown and is generally designated by reference character 20. As shown, MFC 20 can include a housing 22 and an anode 24 and cathode 26 that can be integrated into housing 22, at the respective distal end 28 and proximal end 30 for the MFC 20, as shown in FIG. 4. A plurality of intake ports 32 can be formed in the housing 22 between proximal end 30 and the distal end 28.

As shown in FIG. 5, the internal structure of the MFC 20 can be seen in greater detail. As shown, intake ports 32 can be in fluid communication with a centrifugal pump 34 (it should be appreciated that other types of pumps would work, centrifugal pumps 34 were used because the pump structure can handle a little sediment and because centrifugal pumps can have a relatively high flow rate). Pump 34 can receive fluid from the surrounding submerged environment and output the fluid through longitudinal conduit 36. Longitudinal conduit 36 can extend from the output of pump 34 through distal end 28 of MFC 20. MFC 20 can further include a vibrating device 38, which can be in a watertight portion 40 of MFC 20, in fluid isolation from pump 34.

An electronic payload 35 can also be included in watertight portion 40. Electronics payload 35 can allow electron flow and energy capture to manage the energy produced from the coupled reduction-oxidation reactions occurring at the anode 24 and cathode 26. Energy captured in this manner could be used to power electronics devices, charge a secondary high power battery, or supplement existing battery capacity in the device (for example, energy generated from MFC 20 can be used to recharge batteries that may have been used to activate pump 34 and vibrating device 38 to accomplish the partial self-burial process as described below). Or, the energy could be used as the enabler for remote sensors, or acoustic sensor network stations, or UUV charging stations, or as the power source to reduce bio fouling reduction on conductive surfaces of subsea structures by the application of electric potential. The MFC 20 according to several embodiments could be used near coastal or subsea structures to provide cathodic protection. Corrosion is reduced by shifting the corrosion potential of an electrode, or protected structure, towards a less oxidizing potential by an external DC power source. Electronic payload 35 could be an environmental sensor, a magnetometer, a communications device, or an acoustic sensor.

Several embodiments could utilize the MFC 20 of the present invention to harvest energy to supplement an existing battery supply (not shown in FIGS. 4-5). In this manner, the MFC device could be utilized to provide standby power to onboard instruments (like electronic payload 35) or trickle charge onboard batteries. In either case, the lifetime of the device could be extended by incorporation of this MFC of the present invention.

For the MFC 20 of the present invention according to several embodiments, a plurality of fins 44 and a tip structure 46 can be included at distal end 28 of MFC 20. Tip structure 46 can be in alignment with longitudinal conduit 36, and can help prevent fluidized sediment from entering into longitudinal conduit 36. Fins 44 also help to separate tip structure 46 from the surrounding sediment 18. Such separation can allow for fluid to readily exit tip structure 46 and be dispersed into the sea floor (sediment 18) immediately surrounding distal end 28 to fluidize the surrounding sediment. Such fluidization of the sediment surrounding distal end 28 can further allow MFC 20 to more readily and rapidly bury itself into the sea floor. Fins 44 also allow the system to maintain a vertical stance and resist pullout after burial. This structure and cooperation of structure for these embodiments are described in greater detail in U.S. Pat. No. 7,736,094, which issued to Bianchi et al. for an invention entitled Self-Container Burying Device for Submerged Environments, and which is assigned to the same assignee as the present invention. The contents of the '094 reference are hereby incorporated by reference.

Figure 6:
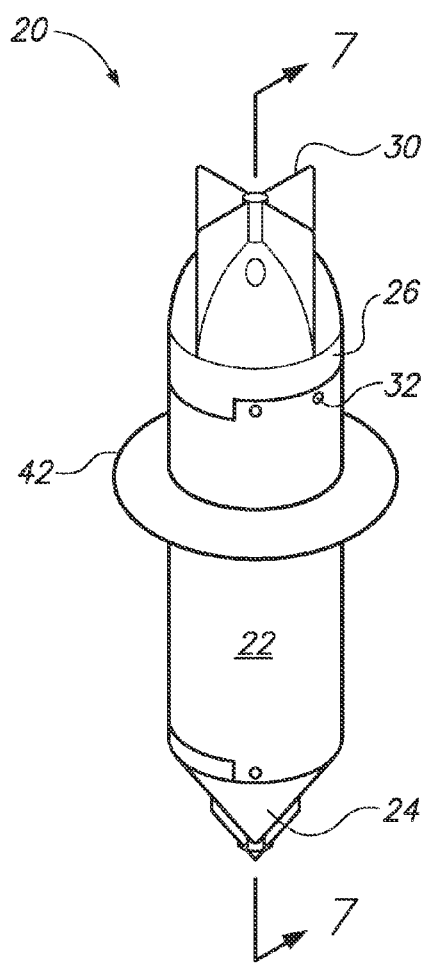
FIG. 6 is a side elevational view of the self-burying microbial fuel cell of the present invention according to several alternative embodiments.
Figure 7:
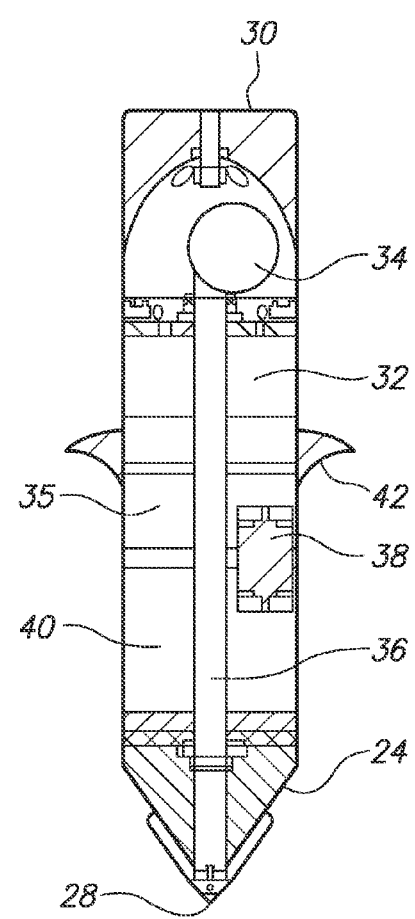
FIG. 7 is a cross-sectional view taken along line 7-7 in FIG. 6

Referring now to FIGS. 6-7, alternative embodiments of the self-burying embodiments of MFC 20 can be seen. For these embodiments, a flange 42 can be attached to the housing 20 between proximal end 30 and distal end 28 of the MFC 20. The flange can stop the burying process and ensure that the MFC 20 is only partially buried and in the correct configuration for operation, i.e. that the anode 24 is buried in sediment while the cathode 26 is exposed to the seawater/submerged environment. This is an alternative configuration to the embodiment shown in FIG. 5, wherein the partial self-burial process occurred due to the location of intake ports 32 on housing 22, i.e., the MFC 20, continued to self-bury until the intake ports 32 were covered (which means that pump 34 can no longer pump fluid to create the slurry surrounding tip structure 46, to allow for further burial. In still other embodiments. As disclosed in the previous embodiments illustrated in FIG. 5, electronic payload 35 and vibrating device 38 can be located within watertight portion 40. A timer (not shown) could be used to deactivate the pump 34 and/or the vibrating device 38 to stop the burial process once the MFC 20 is buried at the correct depth.

Figure 8:
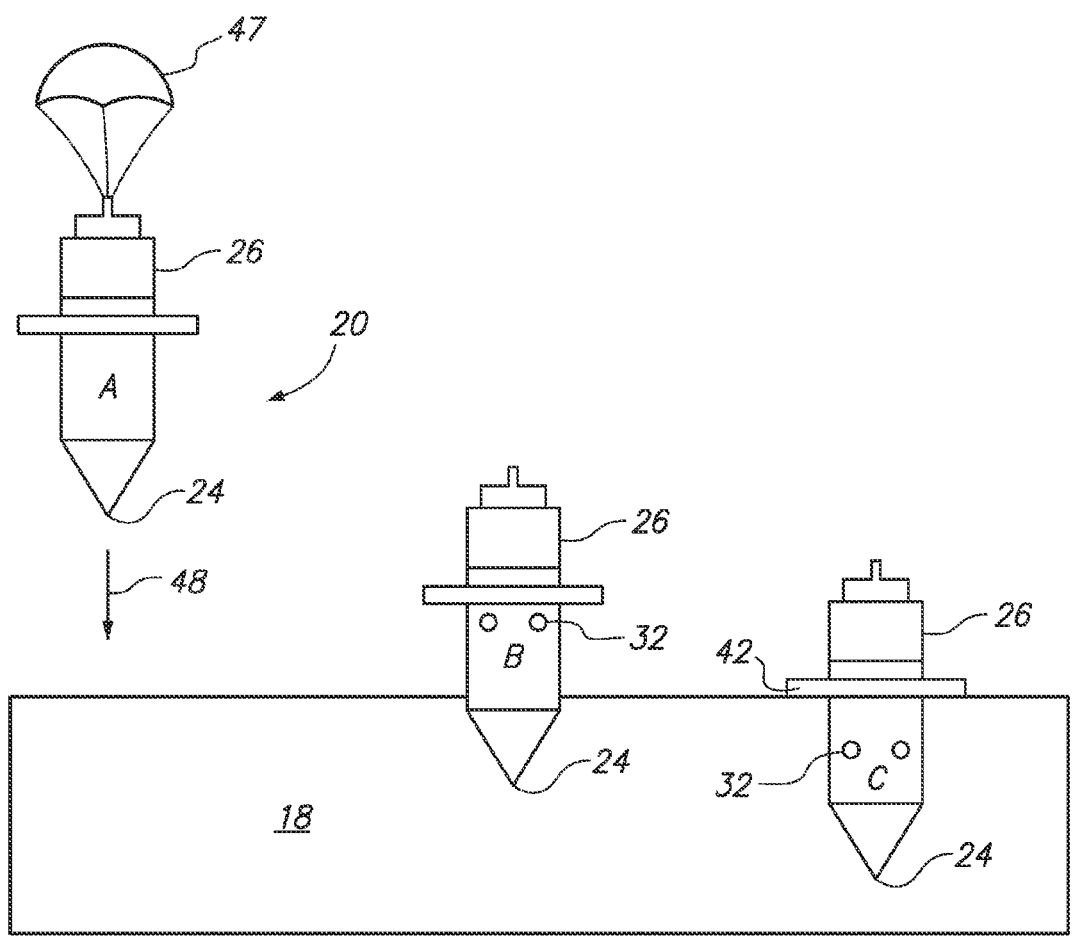
FIG. 8 is a depiction of the burying process for the self-burying microbial fuel cell of the present invention according to several embodiments; and, FIG. 9 is a block diagram, which can used to illustrate the steps that can be taken to practice the methods of the present invention according to several embodiments.

Referring now to FIG. 8, a diagram illustrating a process for deploying MFC 20, and the partial burying of the MFC 20 into the sea floor is shown. As shown, MFC housing 22 can have a hydrodynamic shape, and distal end 28 can be weighted for correct orientation during descent in the direction indicated by arrow 48, for increased deployment speed and to maintain stable trajectory during descent. In some embodiments, the MFC 20 can be aided in its descent to sea floor by a propellant. In still other embodiments, and as also shown at time A, MFC 20 can be tethered to a chute 47, in order to increase hydrodynamic drag (if needed) and reduce impact forces once MFC 20 contacts the ocean floor. This configuration could be used near coastal or subsea structures to provide cathodic protection.

At time B in FIG. 8, MFC 20 has reached contact with sediment 18 from the sea floor, and pump 34 and vibrating device 38 can be activated to begin the burial process as described above. Pump 34 and vibrating device 38 can be activated by a remote operator of MFC 20, which may remotely transmit a signal to circuitry (not shown), such signal causing circuitry to activate vibrating device 38 and pump 34 such that MFC 20 may immediately commence burying once MFC 20 has reached sea floor. In other embodiments, a sensor can cause vibratory device 38 and pump 34 to activate based upon a certain event, such as MFC 20 reaching a predetermined depth at a known hydrostatic pressure or upon deployment acceleration or deceleration.

At time C, flange 42 has engaged the sea floor and MFC 20 is partially buried. Alternatively for other embodiments, the intake ports 32 are below the sediment/submerged environment interface and have become plugged, which can also stop the burial process, as described above. At time C, MFC is oriented corrected and ready for operation as an MFC. Operation of MFC 20 may also be remotely stopped or may automatically stop based upon a signal received by circuitry, which can be activated from an on-board sensor or programmed operation, or by a timer, or by a contact switch on the housing which can close once the MFC is buried at a certain depth, or due to a relay which can cause the vibrating device to stop once the pump stops. Electronic payload 35 can also be activated, based upon the aforementioned circuitry, an on-board sensor, programmed operation, or acoustic/pressure response activation (i.e., a different or same pressure switch could activate the electronic payload, in addition to deactivating the vibrating device).

From the above, it can be appreciated that since the MFC 20 is partially buried, it can provide greater anchoring strength, and can withstand greater disruption forces than that the MFC 10 of the prior art. This can lead to greater survivability in the system in a fished ocean environment.

For the materials of the present invention, the buried anode portion of the device could include a non-corrosive conductive material, such as graphite or carbon fiber or others mentioned above, which can be capable of enabling the oxidation of compounds in the sediment. The unburied cathode portion of the device could be composed of a conductive material capable of reduction of materials (e.g. oxygen) in the overlying water column. The mid-section of the housing could be constructed such that the two electrodes are electrically isolated from one another and so that it could be able to house a payload and the MFC electronics, and also so that the housing can withstand the initial impact once the MFC hits the sea floor. Materials that could be used can include 6061 aluminum, or an acetal copolymer, for example.

Materials for the anode 24 and cathode 26 could be any electrically conductive material that would not degrade or corrode when the system would be deployed at the sediment-water interface. Normally, these materials are carbon based materials such as graphite, activated carbon, carbon fiber, or carbon nanomaterial. Metal-based catalysts have also been used in previous MFC designs to increase reaction rates at the cathode. These have included precious metals, metal oxides (iron oxides, titanium oxide, copper oxide), and organic-metal complexes, such as chelated iron, for example.

The current design is different from the prior art in that the entire MFC system is entirely contained in the self-burying device. The device itself has been shown to be self-burying, eliminating the need for manipulation of the system at the sediment surface. The self-burying device can further eliminate the need for divers and can also allow for deployment of the system in water depths and conditions that are not accessible to divers such as deep water, contaminated water, or waters with limited access or otherwise unsafe conditions for divers. The self-contained aspect of the system also results in a reduced risk of component separation during deployment and allows for consistent positioning of the electrodes at the sediment-water interface. The MFC 20 of the present invention could provide a significant energy advantage over existing remote power supplies. Remote systems are limited by a finite volume to store chemical energy. Since MFC 20 harnesses energy from the surrounding environment, volume limitations can be avoided. In addition, adverse storage, and shipment issues of battery systems prior to deployment are avoided, such as the reduced energy capacity that would be available due to temperature extremes or self-discharge.

Figure 9:
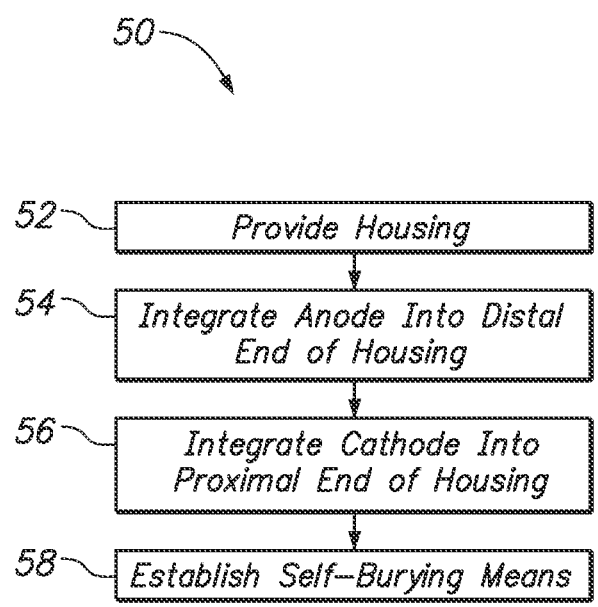

Referring now to FIG. 9, block diagram 50 can be used to describe the methods for the present invention according to several embodiments. As shown, method 50 can include the initial step 52 of providing a housing with conductive elements, as shown by step 52, and by integrating an anode 24 into the distal end 28 of the housing 22, as shown by step 54. Similarly, a cathode 26 can be integrated into the proximal end 30 of the housing, as shown by step 56. The materials, structure and cooperation of structure for the housing 22, anode 24 and cathode 26 can be as described above.

Once the anode 24 and cathode 26 are integrated into the housing 22, the methods of the present invention can further include the step 58 of establishing a means for partially self-burying the MFC 20. This step can be accomplished so that the anode 24 is buried in sediment 18, and the cathode can be exposed to the seawater during operation of the MFC 20. In some embodiments, this can be accomplished by including the flange 42 structure as described above. In still other embodiments, this can be accomplished by arranging the intake ports 32 on the housing according to the depth of desired self-burial that is desired for the MFC 20 by the operator.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A microbial fuel cell comprising:
   a housing with conductive elements having a proximal end and a distal end;
   an anode integrated into said housing at said distal end;
   a cathode integrated into said housing at said proximal end;
   an omni-directional vibrating device located within said housing;
   a plurality of intake ports formed in said housing between said proximal end and said distal end;
   a pump in fluid communication with said plurality of intake ports;
   a longitudinal fluid conduit in fluid communication with said pump, said longitudinal fluid conduit extending through said distal end of said housing; and,
   said vibrating device, said pump, said plurality of intake ports and said longitudinal fluid conduit cooperating to bury said microbial fuel cell in a submerged environment, so that said anode is buried and said cathode is exposed to said submerged environment.

2. The microbial fuel cell of claim 1, wherein said intake ports are located on said housing according to how much of said housing is to be buried.

3. The microbial fuel cell of claim 1 further comprising a flange mounted on said housing between said anode and said cathode.

4. The microbial fuel cell of claim 1, further comprising a timer for selectively deactivating said vibrating device and said pump.

5. The microbial fuel cell of claim 1, wherein said housing has a mid-section located between said cathode and said anode, and wherein said mid-section is constructed such that the said anode and said cathode are electrically isolated from one another and so that said mid-section is made from a material selected from the group consisting of 6061 aluminum and an acetal copolymer.

6. A method for deploying a microbial fuel cell, comprising the steps of:
   A) providing a housing with conductive elements having a proximal end and a distal end;
   B) integrating an anode into said housing at said distal end;
   C) integrating a cathode into said housing at said proximal end;
   D) burying said microbial fuel cell in a submerged environment, so that said anode is buried and said cathode is exposed to said submerged environment, said burying step being accomplished by;
   D1) locating an omni-directional vibrating device within said housing;
   D2) forming a plurality of intake ports in said housing between said proximal end and said distal end;
   D3) placing a pump in fluid communication with said plurality of intake ports; and
   D4) placing a longitudinal fluid conduit in fluid communication with said pump, said longitudinal fluid conduit extending through said distal end of said housing.

7. The method of claim 6, wherein said intake ports are located on said housing according to how much of said housing is to be buried.

8. The method of claim 6 further comprising the step D5) of mounting a flange mounted on said housing between said anode and said cathode.

9. The method of claim 6, further comprising the steps of:
   D6) attaching a timer to said vibrating device and said pump; and,
   D7) selectively setting said timer to deactivate said vibrating device and said pump.

10. The method of claim 6, wherein said providing step is accomplished using a housing having a mid-section located between said cathode and said anode, and wherein said mid-section is constructed such that said cathode and said anode are electrically isolated from one another and so that the mid-section is made from a material selected from the group consisting of 6061 aluminum and an acetal copolymer.

11. A microbial fuel cell comprising:
   a housing with conductive elements said housing having a proximal end and a distal end;
   an anode integrated into said housing at said distal end;
   a cathode integrated into said housing at said proximal end;
   an omni-directional vibrating device;
   a plurality of intake ports formed in said housing between said proximal end and said distal end;
   a pump in fluid communication with said plurality of intake ports;

a longitudinal fluid conduit in fluid communication with said pump, said longitudinal fluid conduit extending through said distal end of said housing; and, said vibrating device, said pump, said plurality of intake ports and said longitudinal fluid conduit cooperating to self-bury said microbial fuel cell in a submerged environment, so that said anode is buried and said cathode is exposed to said submerged environment.

12. The microbial fuel cell of claim 11, wherein said intake ports are located on said housing according to how much of said housing is to be buried.

13. The microbial fuel cell of claim 11 further comprises a flange mounted on said housing between said anode and said cathode.

14. The microbial fuel cell of claim 11, further comprising a timer for deactivating said vibrating device and said pump.

* * * * *